US008660153B2

(12) United States Patent
Chin et al.

(10) Patent No.: US 8,660,153 B2
(45) Date of Patent: Feb. 25, 2014

(54) METHODS AND APPARATUS FOR FRAME NUMBER SYNCHRONIZATION IN WIRELESS COMMUNICATION NETWORKS

(75) Inventors: Tom Chin, San Diego, CA (US); Shan Qing, San Diego, CA (US); Kuo-Chun Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1056 days.

(21) Appl. No.: 12/211,873

(22) Filed: Sep. 17, 2008

(65) Prior Publication Data
US 2010/0067515 A1    Mar. 18, 2010

(51) Int. Cl.
*H04J 3/06*    (2006.01)

(52) U.S. Cl.
USPC .......................................... 370/516; 370/350

(58) Field of Classification Search
USPC ......................................... 370/350, 503, 516
See application file for complete search history.

(56) References Cited

U.S. PATENT DOCUMENTS

| | | | |
|---|---|---|---|
| 5,734,985 A | 3/1998 | Ito et al. | |
| 7,324,510 B2* | 1/2008 | Howe | 370/386 |
| 7,327,310 B2* | 2/2008 | Abraham et al. | 342/357.62 |
| 7,394,802 B2* | 7/2008 | Jun et al. | 370/350 |
| 7,408,916 B2* | 8/2008 | Kassinen et al. | 370/350 |
| 7,409,214 B2 | 8/2008 | Lee | |
| 2003/0107513 A1* | 6/2003 | Abraham et al. | 342/357.1 |
| 2003/0156575 A1 | 8/2003 | Kassinen et al. | |
| 2005/0043046 A1 | 2/2005 | Lee | |
| 2006/0116131 A1* | 6/2006 | Morgan et al. | 455/456.1 |
| 2009/0080406 A1* | 3/2009 | Gopal et al. | 370/350 |
| 2010/0061322 A1* | 3/2010 | Kim et al. | 370/329 |

FOREIGN PATENT DOCUMENTS

| | | |
|---|---|---|
| EP | 0668667 | 8/1995 |
| JP | 3166174 B2 | 5/2001 |
| JP | 2008182385 A | 8/2008 |
| KR | 100547804 | 1/2006 |
| KR | 100736571 B1 | 6/2007 |
| KR | 100744326 B1 | 7/2007 |
| KR | 20080047293 A | 5/2008 |
| TW | 293230 B | 2/2008 |

OTHER PUBLICATIONS

International Search Report and Written Opinion—PCT/US2009/055714, International Search Authority—European Patent Office—Mar. 4, 2010.
Taiwan Search Report—TW098131400—TIPO—Aug. 23, 2012.

* cited by examiner

*Primary Examiner* — Phuc Tran
(74) *Attorney, Agent, or Firm* — Tyler J. Overall (57) ABSTRACT

A method for frame number synchronization in a wireless communication network may be implemented by a base station. The method may include determining a current time from a timing source that is common to multiple other base stations. The method may also include determining a time offset between the current time and a reference time, wherein the base station and the multiple other base stations use the same reference time for determining the time offset. The method may also include determining a current frame number based on the time offset.

30 Claims, 7 Drawing Sheets

METHODS AND APPARATUS FOR FRAME NUMBER SYNCHRONIZATION IN WIRELESS COMMUNICATION NETWORKS

TECHNICAL FIELD

The present disclosure relates generally to communication systems. More specifically, the present disclosure relates to methods and apparatus for frame number synchronization in wireless communication networks.

BACKGROUND

As used herein, the term "mobile station" refers to an electronic device that may be used for voice and/or data communication over a wireless communication network. Examples of mobile stations include cellular phones, personal digital assistants (PDAs), handheld devices, wireless modems, laptop computers, personal computers, etc. A mobile station may alternatively be referred to as an access terminal, a mobile terminal, a subscriber station, a remote station, a user terminal, a terminal, a subscriber unit, user equipment, etc.

A wireless communication network may provide communication for a number of mobile stations, each of which may be serviced by a base station. A base station may alternatively be referred to as an access point, a Node B, or some other terminology.

A mobile station may communicate with one or more base stations via transmissions on the uplink and the downlink. The uplink (or reverse link) refers to the communication link from the mobile station to the base station, and the downlink (or forward link) refers to the communication link from the base station to the mobile station.

The resources of a wireless communication network (e.g., bandwidth and transmit power) may be shared among multiple mobile stations. A variety of multiple access techniques are known, including code division multiple access (CDMA), time division multiple access (TDMA), frequency division multiple access (FDMA), and orthogonal frequency division multiple access (OFDMA).

Benefits may be realized by improved methods and apparatus related to the operation of wireless communication networks.

SUMMARY

A method for frame number synchronization in a wireless communication network is disclosed. The method may be implemented by a base station. The method may include determining a current time from a timing source that is common to multiple other base stations. The method may also include determining a time offset between the current time and a reference time. The base station and the multiple other base stations may use the same reference time for determining the time offset. The method may also include determining a delay to get an integral time offset. The method may also include determining a current frame number based on the integral time offset.

A base station configured for frame number synchronization in a wireless communication network is disclosed. The base station may include a processor. The base station may also include memory in electronic communication with the processor. The base station may also include instructions stored in the memory. The instructions may be executable by the processor to determine a current time from a timing source that is common to multiple other base stations. The instructions may also be executable to determine a time offset between the current time and a reference time. The base station and the multiple other base stations may use the same reference time for determining the time offset. The instructions may also be executable to determine a delay to get an integral time offset. The instructions may further be executable to determine a current frame number based on the integral time offset.

A base station configured for frame number synchronization in a wireless communication network is disclosed. The base station may include means for determining a current time from a timing source that is common to multiple other base stations. The base station may also include means for determining a time offset between the current time and a reference time. The base station and the multiple other base stations may use the same reference time for determining the time offset. The base station may also include means for determining a delay to get an integral time offset. The base station may also include means for determining a current frame number based on the integral time offset.

A computer-program product for frame number synchronization in a wireless communication network by a base station is disclosed. The computer-program product may include a computer-readable medium having instructions thereon. The instructions may include code for determining a current time from a timing source that is common to multiple other base stations. The instructions may also include code for determining a time offset between the current time and a reference time. The base station and the multiple other base stations may use the same reference time for determining the time offset. The instructions may also include code for determining a delay to get an integral time offset. The instructions may also include code for determining a current frame number based on the integral time offset.

DETAILED DESCRIPTION

The methods and apparatus of the present disclosure may be utilized in a broadband wireless communication network. The term "broadband wireless" refers to technology that provides wireless, voice, Internet, and/or data network access over a given area.

The Institute of Electronic and Electrical Engineers (IEEE) 802.16 Working Group on Broadband Wireless Access Standards aims to prepare formal specifications for the global deployment of broadband Wireless Metropolitan Area Networks. Although the 802.16 family of standards is officially called WirelessMAN, it has been called "WiMAX" (which stands for the "Worldwide Interoperability for Microwave Access") by an industry group called the WiMAX Forum. Thus, the term "WiMAX" refers to a standards-based broadband wireless technology that provides high-throughput broadband connections over long distances.

Some of the examples described herein are relevant to wireless communication networks that are configured in accordance with WiMAX standards. However, these examples should not be interpreted as limiting the scope of the present disclosure.

WiMAX is based on OFDM (orthogonal frequency division multiplexing) and OFDMA (orthogonal frequency division multiple access) technology. OFDM is a digital multi-carrier modulation technique that has recently found wide adoption in a variety of high-data-rate communication networks. With OFDM, a transmit bit stream is divided into multiple lower-rate substreams. Each substream is modulated with one of multiple orthogonal subcarriers and sent over one of a plurality of parallel subchannels. OFDMA is a multiple access technique in which users are assigned subcarriers in different time slots. OFDMA is a flexible multiple-access technique that can accommodate many users with widely varying applications, data rates, and quality of service requirements.

Figure 1:
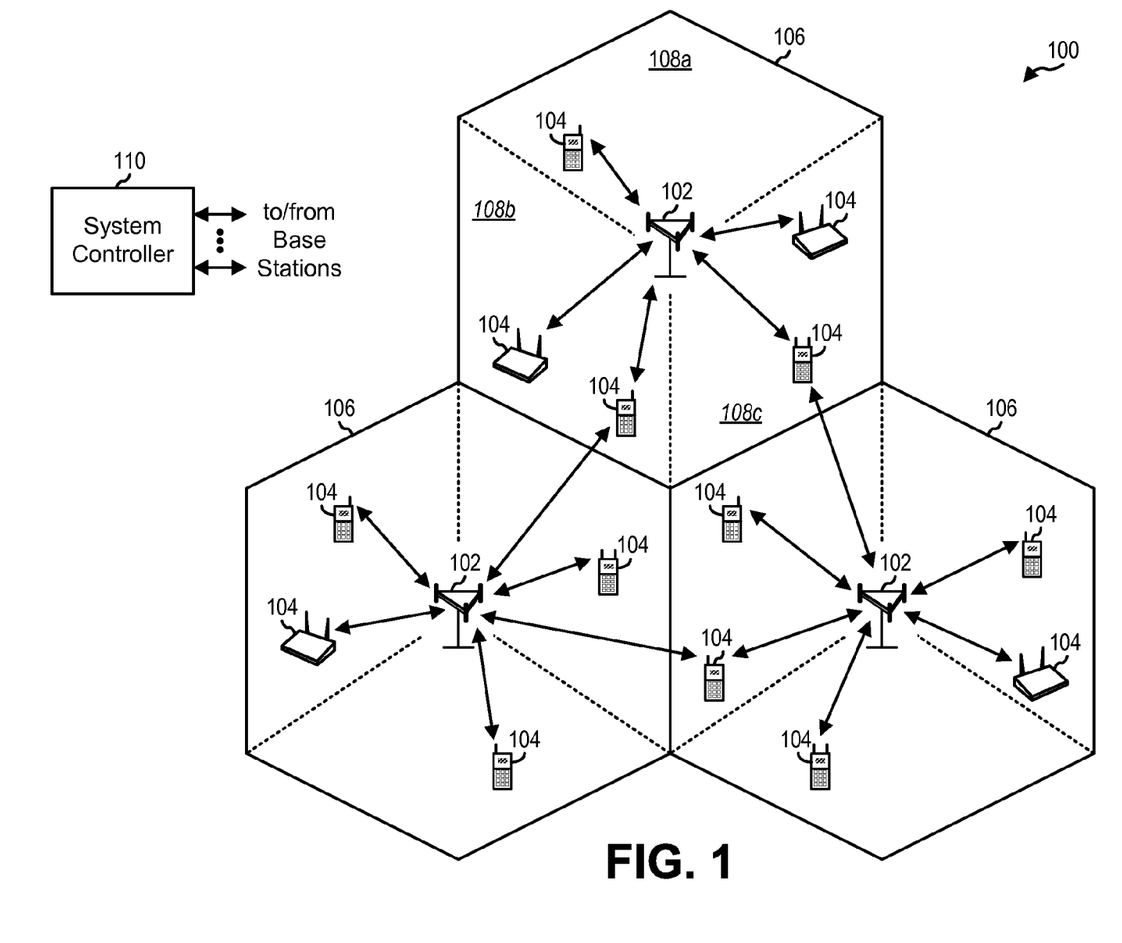
FIG. 1 illustrates a wireless communication system with multiple base stations and multiple mobile stations.

FIG. 1 shows a wireless communication system 100 with multiple base stations (BS) 102 and multiple mobile stations (MS) 104. A base station 102 is a station that communicates with the mobile stations 104. A base station 102 may also be called, and may contain some or all of the functionality of, an access point, a Node B, an evolved Node B, etc. Each base station 102 provides communication coverage for a particular geographic area 106. The term "cell" can refer to a base station 102 and/or its coverage area 106 depending on the context in which the term is used. To improve system capacity, a base station coverage area 106 may be partitioned into multiple smaller areas, e.g., three smaller areas 108a, 108b, and 108c. Each smaller area 108a, 108b, 108c may be served by a respective base transceiver station (BTS). The term "sector" can refer to a BTS and/or its coverage area 108 depending on the context in which the term is used. For a sectorized cell, the BTSs for all sectors of that cell are typically co-located within the base station 102 for the cell.

Mobile stations 104 are typically dispersed throughout the system 100. A mobile station 104 may also be called, and may contain some or all of the functionality of, a terminal, an access terminal, a user equipment, a subscriber unit, a station, etc. A mobile station 104 may be a cellular phone, a personal digital assistant (PDA), a wireless device, a wireless modem, a handheld device, a laptop computer, etc. A mobile station 104 may communicate with zero, one, or multiple base stations 104 on the downlink (DL) and/or uplink (UL) at any given moment. The downlink (or forward link) refers to the communication link from the base stations 102 to the mobile stations 104, and the uplink (or reverse link) refers to the communication link from the mobile stations 104 to the base stations 102.

For a centralized architecture, a system controller 110 may couple to base stations 102 and provide coordination and control for these base stations 102. The system controller 110 may be a single network entity or a collection of network entities. For a distributed architecture, base stations 102 may communicate with one another as needed.

Figure 2:
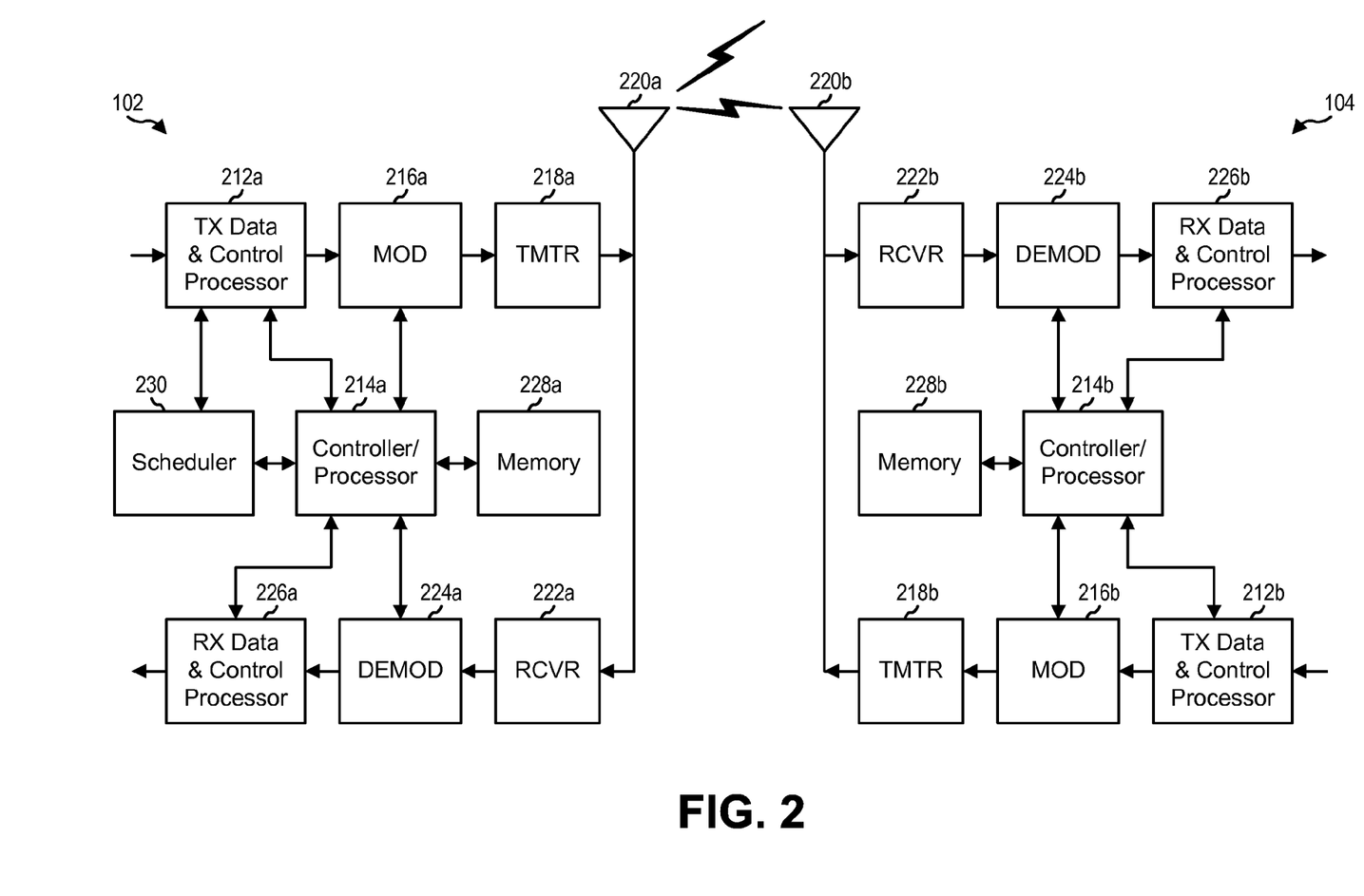
FIG. 2 illustrates a block diagram of a design of a base station and a mobile station.

FIG. 2 shows a block diagram of a design of a base station 102 and a mobile station 104, which may be one of the base stations 102 and one of the mobile stations 104 in FIG. 1. At the base station 102, a transmit (TX) data and control processor 212a may receive traffic data from a data source (not shown) and/or control information from a controller/processor 214a. The processor 212a may process (e.g., format, encode, interleave, and symbol map) the traffic data and control information and provide modulation symbols. A modulator (MOD) 216a may process the modulation symbols (e.g., for OFDM) and provide output chips. A transmitter (TMTR) 218a may process (e.g., convert to analog, amplify, filter, and upconvert) the output chips and generate a downlink signal, which may be transmitted via an antenna 220a.

At the mobile station 104, an antenna 220b may receive the downlink signals from the base station 102 and other base stations 102 and may provide a received signal to a receiver (RCVR) 222b. The receiver 222b may condition (e.g., filter, amplify, downconvert, and digitize) the received signal and provide received samples. A demodulator (DEMOD) 224b may process the received samples (e.g., for OFDM) and provide demodulated symbols. A receive (RX) data and control processor 226b may process (e.g., symbol demap, deinterleave, and decode) the demodulated symbols to obtain decoded data and control information for the mobile station 104.

On the uplink, at the mobile station 104, data and control information to be sent by the mobile station 104 may be processed by a TX data and control processor 212b, modulated by a modulator 216b, conditioned by a transmitter 218b, and transmitted via an antenna 220b. At the base station 102, the uplink signals from the mobile station 104 and possibly other mobile stations 104 may be received by an antenna 220a, conditioned by a receiver 222a, demodulated by a demodulator 224a, and processed by an RX data and control processor 226a to recover the data and control information sent by the mobile station 104. In general, the processing for uplink transmission may be similar to or different from the processing for downlink transmission.

Controllers/processors 214a and 214b may direct the operation at the base station 102 and the mobile station 104, respectively. Memories 228a and 228b may store data and program codes for the base station 102 and the mobile station 104, respectively. A scheduler 230 may schedule mobile stations 104 for downlink and/or uplink transmission and may provide assignments of system resources.

Certain aspects of the present disclosure are related to idle mode in a WiMAX network. In mobile WiMAX, idle mode is a mechanism that allows the mobile station to receive broadcast downlink transmission from the base station without registering itself with the network. For idle-mode operation, groups of base stations are assigned to a paging group. A mobile station in idle mode periodically monitors downlink transmission of the network to determine the paging group of its current location. On detecting that it has moved to a new paging group, a mobile station performs a paging group update during which it informs the network of the current paging group in which it is present. In order to establish a connection with a mobile station in idle mode, the network may page the mobile station only in the base stations belonging to the current paging group of the mobile station.

During idle-mode operation, the mobile station can be in either a "paging-unavailable" interval or in a "paging-listen" interval. During the "paging-unavailable" interval, the mobile station is not available for paging and can power down, conduct ranging with a neighboring base station, or scan the neighboring base stations for the received signal strength and/or signal-to-noise ratio. During the "paging-listen" interval, the mobile station listens to the Downlink Channel Descriptor (DCD) and downlink MAP (DL-MAP) messages of the serving base station to determine when the broadcast paging message is scheduled. If the mobile station is paged in the broadcast paging message, the mobile station responds to the page and terminates its idle mode operation. If the mobile station is not paged in the broadcast paging message, the mobile station enters the next "paging-unavailable" interval.

The present disclosure relates generally to a frame number synchronization method in wireless communication networks, such as WiMAX networks.

In a mobile WiMAX network, each frame has a 24-bit frame number. This frame number increments every frame from zero until the maximum value ($2^{24}-1$) is reached before re-starting from zero.

This frame number can be used to decide when a base station should send a page message, and when a mobile station should listen to a page message. A mobile station starts to listen to the page advertisement message (MOB_PAG-ADV) from frame number N when:

$$N \bmod Paging\_Cycle = Paging\_Offset \quad (1)$$

However, each base station does not necessarily have the identical frame number at the same time. This implies that a mobile station can miss a page message when moving from an old base station to a new base station while in idle mode. This is because the new base station can have a different frame number count than the old base station, although both base stations use the same Paging_Cycle and Paging_Offset parameters. The mobile station can still follow the frame number count corresponding to the old base station until the next listening interval; then the mobile station can update the frame number to be in synchronization with the new base station.

In order to resolve this problem, the present disclosure proposes that all base stations in the same paging group use a common timing source to determine the current time for purposes of running the frame number counter. The common timing source can be a locally installed GPS receiver at the base station. Alternatively, the base station may operate in accordance with the Network Time Protocol (NTP), as defined in Internet Engineering Task Force (IETF) Request for Comments (RFC) 1305, to receive time stamps in units of $2^{-32}$ seconds from an NTP server.

After obtaining the current time from the common timing source, a base station may calculate a time offset t_offset between the current time and a reference time. All of the base stations in the same paging group may use the same reference time. The reference time may correspond to frame number=0. The base station may wait for a delay d to get the integral time offset T which is a multiple of frame length: T=t_offset+d and T is a multiple of frame length. Therefore the current frame number may be given by:

$$CurrentFrameNumber = (T/FrameLength) \bmod 2^{24} \quad (2)$$

where T is the integral time offset, and FrameLength is the length of a single frame.

A base station may calibrate the frame number in accordance with equation (2). After calibrating the frame number, each base station may increment the frame number by 1 each FrameLength thereafter. Each base station may periodically re-calibrate the frame number by repeating the process described above (i.e., obtaining the current time, calculating the time offset t_offset, waiting for a delay d, calculating the integral time offset T, and calculating the CurrentFrameNumber in accordance with equation (2)).

Figure 3:
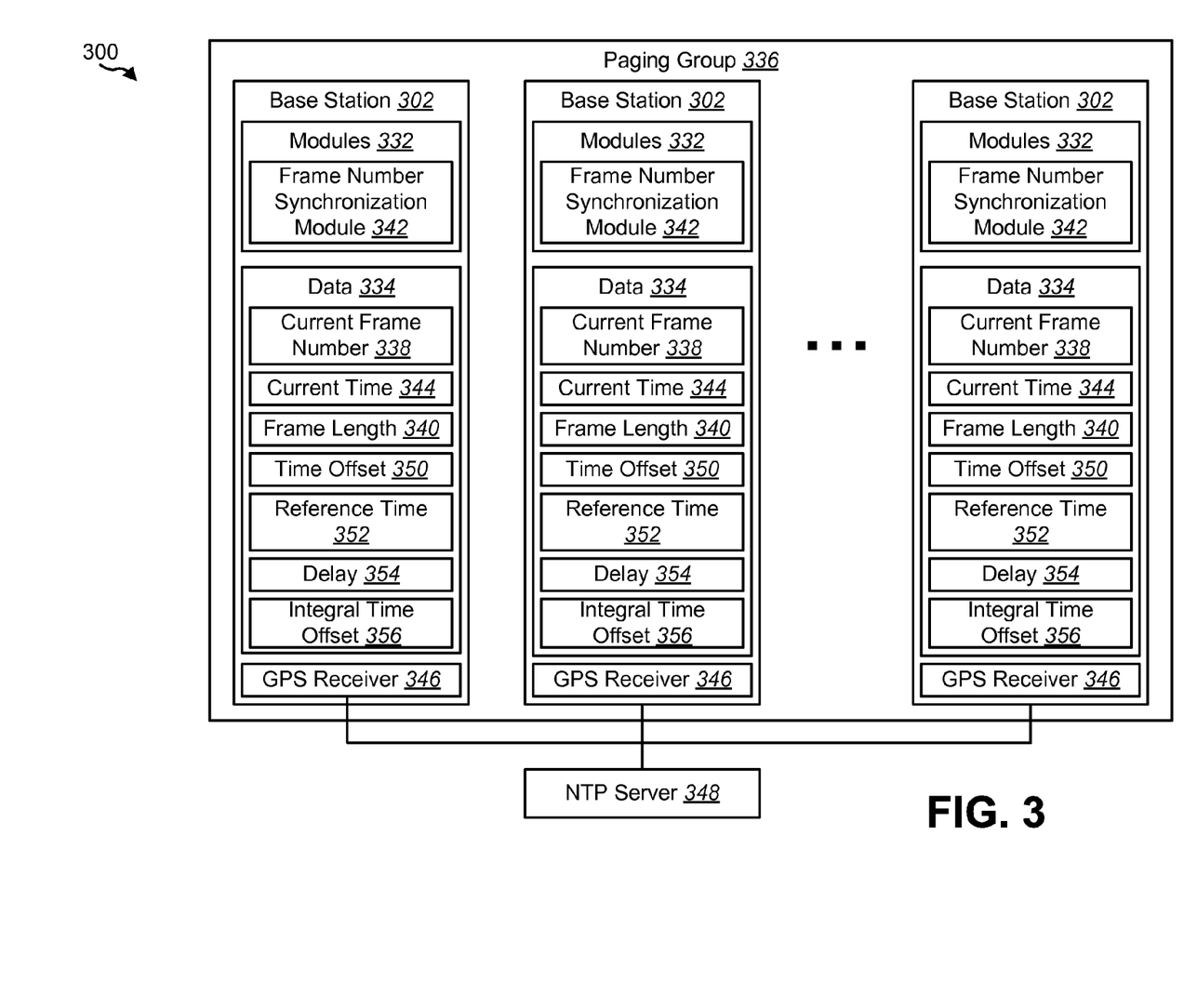
FIG. 3 illustrates an example of a system that is configured for frame number synchronization.

Reference is now made to FIG. 3. FIG. 3 illustrates an example of a system 300 that is configured for frame number synchronization in accordance with the present disclosure.

The system 300 includes multiple base stations 302. Each base station 302 includes various functional modules 332 and data 334. The base stations 302 that are shown in FIG. 3 may belong to the same paging group 336.

Each base station 302 may keep track of the current frame number 338. The current frame number 338 may be incremented by one each frame length 340, where the frame length 340 refers to an interval of time. The current frame number 338 may be used for a variety of purposes in a wireless communication network. For example, the current frame number 338 may be used to decide when a base station 302 should send a page message, and when a mobile station should listen to a page message.

Each base station 302 may be configured to synchronize its current frame number 338 with the other base stations 302 in the paging group 336. Each base station 302 is shown with a frame number synchronization module 342 for implementing this functionality.

In order to synchronize its current frame number 338 with that of the other base stations 302 in the paging group 336, a base station 302 may perform the following steps. First, the base station 302 may determine the current time 344 from a common timing source, i.e., a timing source that is common to all of the base stations 302 in the paging group 336. For example, the common timing source may be the Global Positioning System (GPS). In this case, each base station 302 in the paging group 336 may be equipped with a GPS receiver 346 for receiving GPS information conveying the current time 344. As another example, the common timing source may be a Network Time Protocol (NTP) server 348.

When the current time 344 has been determined, then a time offset 350 between the current time 344 and a reference time 352 may then be determined. Since the current time may not be aligned with an integral time offset 356, the base station may need to wait for a delay 354 to get the integral time offset 356. Each base station 302 in the paging group 336 may use the same reference time 352, and the reference time 352 may correspond to frame number=0.

The current frame number 338 may then be determined based on the integral time offset 356. For example, the current frame number 338 may be determined in accordance with equation (2) above, which is repeated below for convenience:

$$CurrentFrameNumber = (T/FrameLength) \bmod 2^{24} \quad (2)$$

Each base station 302 may periodically perform frame number synchronization in the manner just described. It is not necessary that all of the base stations 302 in the paging group 336 perform frame number synchronization at the same time, although they may be configured to operate this way.

Figure 4:
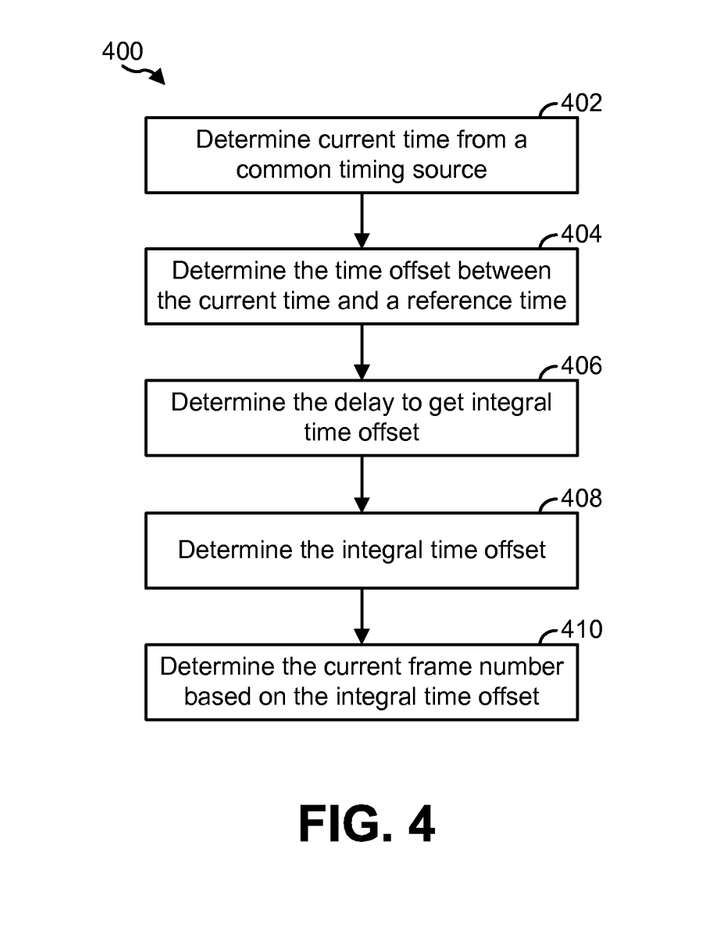
FIG. 4 illustrates an example of a method for frame number synchronization.

Reference is now made to FIG. 4. FIG. 4 illustrates an example of a method 400 for frame number synchronization. The method 400 may be implemented by a base station 302. The method 400 summarizes the functions that may be performed by a base station 302 in accordance with the present disclosure, as described above in relation to FIG. 3.

The method 400 may involve determining 402 a current time 344 from a common timing source, i.e., a timing source that is common to multiple other base stations 302 (e.g., the other base stations 302 that are in the same paging group 336). The common timing source may be the Global Positioning System (accessed via a GPS receiver 346), an NTP server 348, etc.

The method 400 may also involve determining 404 the time offset 350 between the current time 344 and a reference time 352, determining 406 the delay 354 to get the integral time offset 356 and determining 408 the integral time offset 356. Each base station 302 in the paging group 336 may use the same reference time 352, and the reference time 352 may correspond to frame number=0.

The method 400 may also involve determining 410 the current frame number 338 based on the integral time offset 356. For example, the current frame number 338 may be determined in accordance with equation (2) above.

Figure 5:
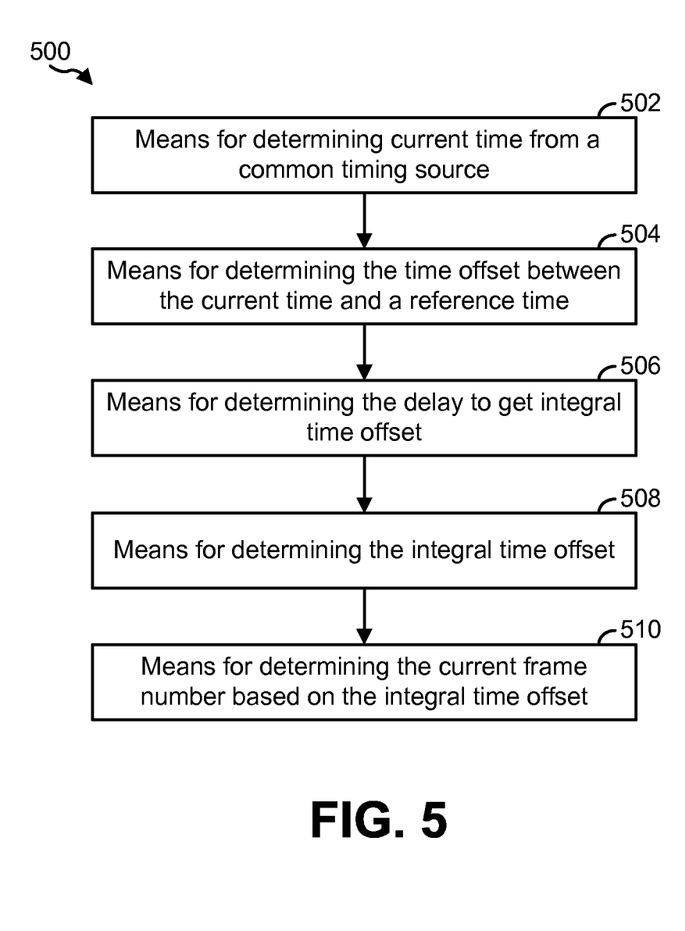
FIG. 5 illustrates means-plus-function blocks corresponding to the method of FIG. 4.

The method 400 of FIG. 4 described above may be performed by various hardware and/or software component(s) and/or module(s) corresponding to the means-plus-function blocks 500 illustrated in FIG. 5. In other words, blocks 402 through 410 illustrated in FIG. 4 correspond to means-plus-function blocks 502 through 510 illustrated in FIG. 5.

The techniques disclosed herein may provide various advantages relative to known approaches. For example, the techniques disclosed herein can allow multiple base stations in a wireless communication network, such as a WiMAX network, to achieve frame number synchronization. This can improve robustness in idle mode, as will be illustrated in FIGS. 6 and 7.

Figure 6:
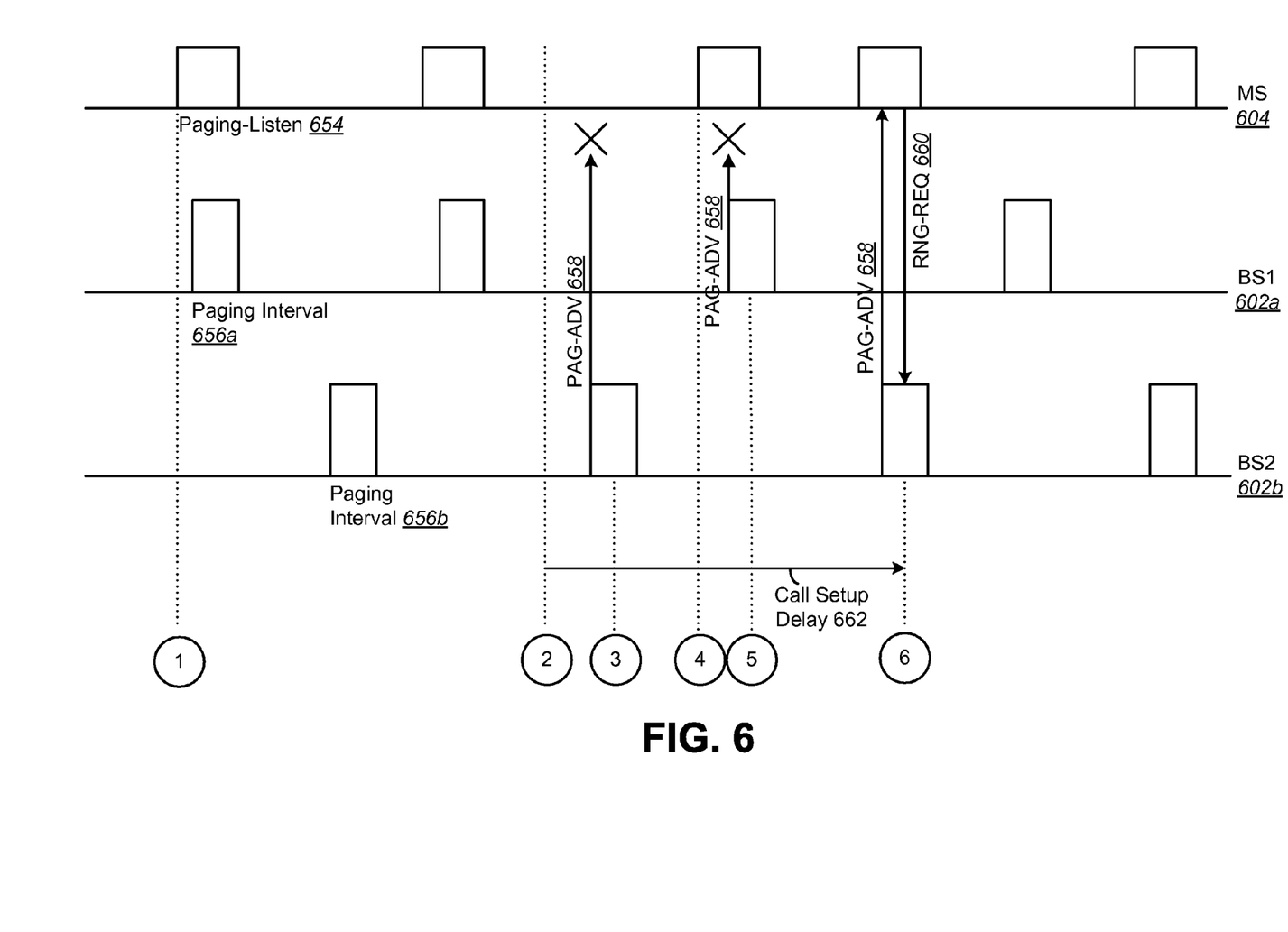
FIG. 6 illustrates an example of paging within a wireless communication network where frame numbers are not synchronized between multiple base stations.

Reference is initially made to FIG. 6. FIG. 6 illustrates an example of paging within a wireless communication network where frame numbers are not synchronized between multiple base stations.

A mobile station 604, a first base station (BS1) 602a, and a second base station (BS2) 602b are shown. The paging-listen intervals 654 of the mobile station 604, the paging intervals 656a of BS1 602a, and the paging intervals 656b of BS2 602b are also shown.

At time point 1 (shown in FIG. 6 as ①), the mobile station 604 is in the coverage area of BS 1 602a and synchronizes itself with the frame numbers corresponding to BS1 602a. At time point 2, a page request 658 arises at the network. At time point 3, the page request 658 by BS2 602b fails since the MS 604 is still asleep.

At time point 4, the MS 604 wakes up, finds itself in the coverage area of BS2 602b, and synchronizes itself with the frame numbers corresponding to BS2 602b. At time point 5, the page request 658 by BS1 602a fails since the MS 604 is in the coverage area of BS2. At time point 6, the BS2 602b sends the page request 658 and succeeds. The MS 604 sends a reply 660 to the page request 658 to BS2 602b.

The period of time between time point 2 and time point 6 may be thought of as the setup delay 662, i.e., the delay 662 between the time that the page request 658 arose at the network and the time that the page request 658 was successfully communicated to the MS 604.

Figure 7:
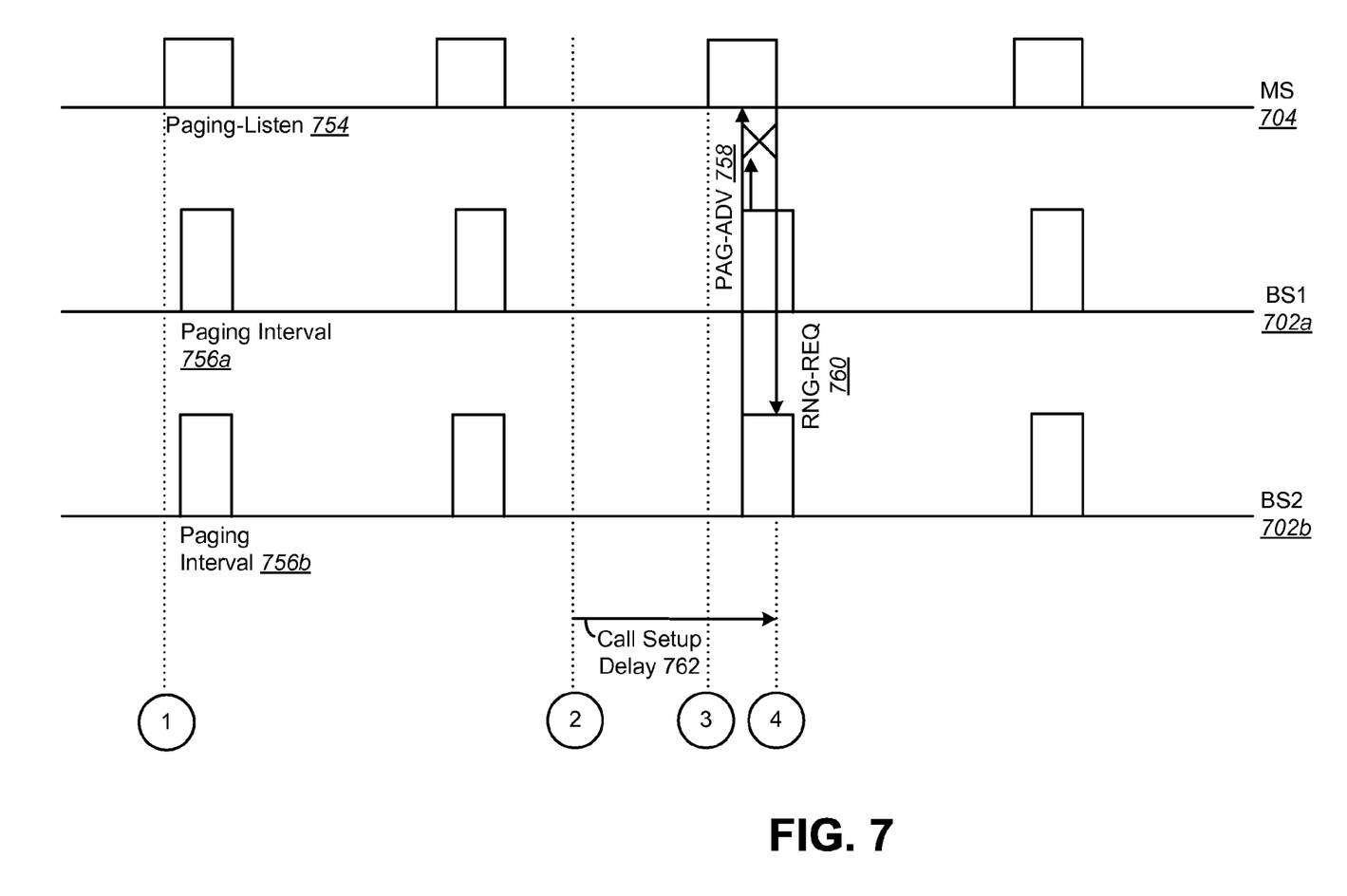
FIG. 7 illustrates an example of paging within a wireless communication network where frame numbers are synchronized between multiple base stations.

Reference is now made to FIG. 7. FIG. 7 illustrates an example of paging within a wireless communication network where frame numbers are synchronized between multiple base stations 702a-b.

As in the previous example, a mobile station (MS) 704, a first base station (BS1) 702a, and a second base station (BS2) 702b are shown. The paging-listen intervals 754 of the mobile station 704, the paging intervals 756a of BS 1 702a, and the paging intervals 756b of BS2 702b are also shown.

At time point 1, the MS 704 is in the coverage area of BS 1 702a, and the MS 704 synchronizes itself with the frame numbers corresponding to BS1 702a. At time point 2, a page request 758 arises at the network.

At time point 3, the MS 704 wakes up and finds itself in the coverage area of BS2 702b. Thus, the MS 704 synchronizes itself with the frame numbers corresponding to BS2 702b.

At time point 4, the page request 758 by BS1 702a fails since the MS 704 is in the coverage area of BS2 702b. However, because the frame numbers between BS1 702a and BS2 702b are synchronized, BS2 702b also sends a page request 758 to the MS 704 at about the same time as BS1 702a. The page request 758 by BS2 702b succeeds.

The period of time between time point 2 and time point 4 is the delay 762 between the time that the page request 758 arose at the network and the time that the page request 758 was successfully communicated to the MS 704.

Upon comparing the example of FIG. 6 with the example of FIG. 7, it may be seen that the delay 762 affecting the mobile terminated call setup in the system where the frame numbers are synchronized (shown in FIG. 7) is less than the delay 662 in the system where the frame numbers are not synchronized (shown in FIG. 6). This illustrates one potential advantage of the frame number synchronization techniques disclosed herein.

Figure 8:
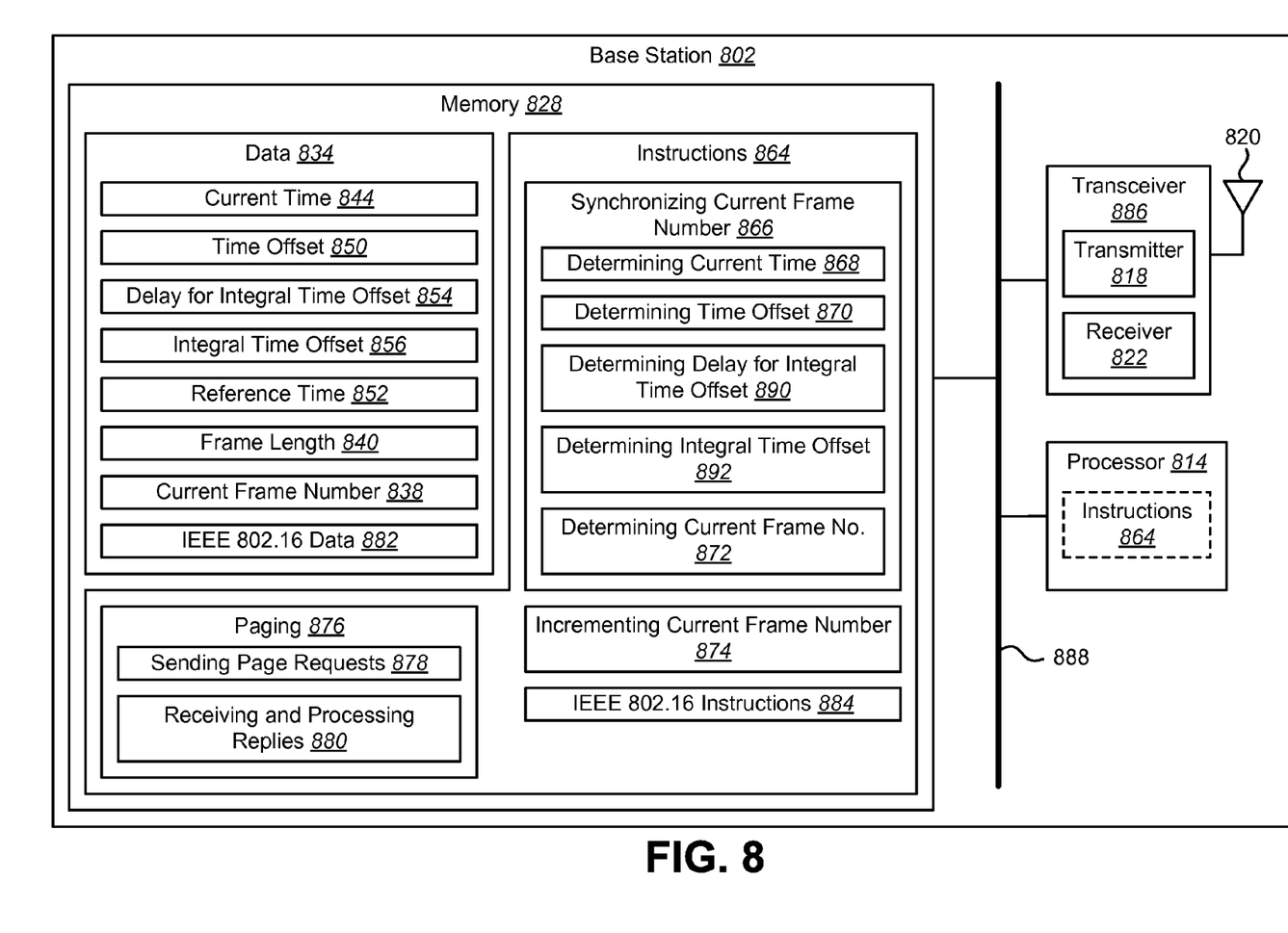
FIG. 8 illustrates certain components that may be included within a base station that is configured for frame number synchronization.

Reference is now made to FIG. 8. FIG. 8 illustrates certain components that may be included within a base station 802 that is configured for frame number synchronization in accordance with the present disclosure.

The base station 802 includes a processor 814. The processor 814 may be a general purpose single- or multi-chip microprocessor (e.g., an ARM), a special purpose microprocessor (e.g., a digital signal processor (DSP)), a microcontroller, a programmable gate array, etc. The processor 814 may be referred to as a central processing unit (CPU). Although just a single processor 814 is shown in the base station 802 of FIG. 8, in an alternative configuration, a combination of processors 814 (e.g., an ARM and DSP) could be used.

The base station 802 also includes memory 828. The memory 828 may be any electronic component capable of storing electronic information. The memory 828 may be embodied as random access memory (RAM), read only memory (ROM), magnetic disk storage media, optical storage media, flash memory devices in RAM, on-board memory included with the processor, EPROM memory, EEPROM memory, registers, and so forth, including combinations thereof.

Data 834 and instructions 864 may be stored in the memory 828. The instructions 864 may be executable by the processor 814 to implement various functions. Executing the instructions 864 may involve the use of the data 834 that is stored in the memory 828.

The base station 802 may include frame synchronization instructions 866 for synchronizing the current frame number 838 with other base stations (e.g., the other base stations within a paging group). The frame synchronization instructions 866 may include instructions 868 for determining the current time 844 from a timing source that is common to multiple other base stations. The frame synchronization instructions 866 may also include instructions 870 for determining a time offset 850 between the current time 844 and a reference time 852, a delay 854 to get an integral time offset 856 and an integral time offset 856. The base station 802 and multiple other base stations (e.g., the other base stations within the same paging group) may use the same reference time 852 for determining the time offset 850. The frame synchronization instructions 866 may also include instructions 872 for determining the current frame number 838 based on the integral time offset 856. The base station 802 may also include instructions 874 for incrementing the current frame number 838 by one each frame length 840.

The base station 802 may also include paging instructions 876. The paging instructions 876 may include instructions 878 for sending page requests, and instructions 880 for receiving and processing replies to the page requests.

The base station 802 may be configured to communicate via a wireless communication network that supports the IEEE 802.16 standard (i.e., WiMAX). The base station 802 may include data 882 that facilitates communication in accordance with the IEEE 802.16 standard. Similarly, the base station 802 may include instructions 884 that facilitate communication in accordance with the IEEE 802.16 standard.

Other types of instructions 864 and data 834 that are relevant to implementing the techniques described herein may also be included in the memory 828.

The base station 802 may also include a transmitter 818 and a receiver 822 to allow transmission and reception of signals between the base station 802 and a remote location. The transmitter 818 and receiver 822 may be collectively referred to as a transceiver 886. An antenna 820 may be electrically coupled to the transceiver 886. The base station 802 may also include (not shown) multiple transmitters 818, multiple receivers 822, multiple transceivers 886 and/or multiple antenna 820.

The various components of the base station 802 may be coupled together by one or more buses, which may include a power bus, a control signal bus, a status signal bus, a data bus, etc. For the sake of clarity, the various buses are illustrated in FIG. 8 as a bus system 888.

The frame number synchronization techniques disclosed herein have been described in connection with paging. However, these techniques can also be used in Fast Base Station Switching (FBSS) or Macro Diversity HO (MDHO) operation.

In the above description, reference numbers have sometimes been used in connection with various terms. Where a term is used in connection with a reference number, this is meant to refer to a specific element that is shown in one or more of the Figures. Where a term is used without a reference number, this is meant to refer generally to the term without limitation to any particular Figure. For example, a reference to "base station 802" refers to the specific base station that is shown in FIG. 8. However, the use of "base station" without a reference number refers to any base station that is appropriate for the context in which the term is used, and is not limited to any particular base station shown in the Figures.

The techniques described herein may be used for various communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

As used herein, the term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory may be integral to a processor and still be said to be in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements. The terms "instructions" and "code" may be used interchangeably herein.

The functions described herein may be implemented in hardware, software, firmware, or any combination thereof If implemented in software, the functions may be stored as one or more instructions on a computer-readable medium. The term "computer-readable medium" refers to any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Bluray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIG. 4, can be downloaded and/or otherwise obtained by a base station. For example, such a device can be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for frame number synchronization in a wireless communication network, the method being implemented by a base station, the method comprising:
   determining a current time from a timing source that is common to multiple other base stations;
   determining a time offset between the current time and a reference time, the reference time corresponding to a reference frame number, the reference frame number being the same for the base station and the multiple other base stations;
   combining the time offset with a delay to get an integral time offset; and
   determining a current frame number based on the integral time offset.

2. The method of claim 1, wherein the common timing source is the Global Positioning System (GPS).

3. The method of claim 1, wherein the common timing source is a Network Time Protocol (NTP) server.

4. The method of claim 1, wherein the base station and the multiple other base stations belong to a same paging group.

5. The method of claim 1, wherein the current frame number is determined as CurrentFrameNumber=(T/FrameLength) mod $2^{24}$, where T is the integral time offset.

6. The method of claim 1, further comprising:
   sending a page request to a mobile station; and
   receiving a reply to the page request from the mobile station.

7. The method of claim 1, wherein the method is performed periodically.

8. The method of claim 1, wherein the reference number corresponds to frame number=0.

9. The method of claim 1, further comprising incrementing the current frame number by one each frame length.

10. The method of claim 1, wherein the base station is configured for operation in a wireless communication network that supports an Institute of Electronic and Electrical Engineers (IEEE) 802.16 standard.

11. A base station configured for frame number synchronization in a wireless communication network, comprising:
    a processor;
    memory in electronic communication with the processor;
    instructions stored in the memory, the instructions being executable by the processor to:
    determine a current time from a timing source that is common to multiple other base stations;
    determine a time offset between the current time and a reference time, the reference time corresponding to a reference frame number, the reference frame number being the same for the base station and the multiple other base stations;
    combine the time offset with a delay to get an integral time offset; and
    determine a current frame number based on the integral time offset.

12. The base station of claim 11, wherein the common timing source is the Global Positioning System (GPS).

13. The base station of claim 11, wherein the common timing source is a Network Time Protocol (NTP) server.

14. The base station of claim 11, wherein the base station and the multiple other base stations belong to a same paging group.

15. The base station of claim 11, wherein the current frame number is determined as CurrentFrameNumber=(T/FrameLength]mod $2^{24}$, where T is the integral time offset.

16. The base station of claim 11, wherein the instructions are also executable to:
    send a page request to a mobile station; and
    receive a reply to the page request from the mobile station.

17. The base station of claim 11, wherein instructions of determining the current time, determining the time offset, and determining the current frame number are performed periodically.

18. The base station of claim 11, wherein the reference number corresponds to frame number =0.

19. The base station of claim 11, wherein the instructions are also executable to increment the current frame number by one each frame length.

20. The base station of claim 11, wherein the base station is configured for operation in a wireless communication network that supports an Institute of Electronic and Electrical Engineers (IEEE) 802.16 standard.

21. A base station configured for frame number synchronization in a wireless communication network, comprising:
    means for determining a current time from a timing source that is common to multiple other base stations;
    means for determining a time offset between the current time and a reference time, the reference time corresponding to a reference frame number, the reference frame number being the same for the base station and the multiple other base stations;
    means for combining the time offset with a delay to get an integral time offset; and
    means for determining a current frame number based on the integral time offset.

22. The base station of claim 21, wherein the common timing source is the Global Positioning System (GPS).

23. The base station of claim 21, wherein the common timing source is a Network Time Protocol (NTP) server.

24. The base station of claim 21, wherein the base station and the multiple other base stations belong to a same paging group.

25. The base station of claim 21, wherein the current frame number is determined as CurrentFrameNumber=(T/FrameLength) mod $2^{24}$, where T is the integral time offset.

26. A non-transitory computer-readable medium storing instructions for a computer-program product, the instructions comprising:
- code for determining a current time from a timing source that is common to multiple other base stations;
- code for determining a time offset between the current time and a reference time, the reference time corresponding to a reference frame number, the reference frame number being the same for the base station and the multiple other base stations;
- code for combining the time offset with a delay to get an integral time offset; and
- code for determining a current frame number based on the integral time offset.

27. The non-transitory computer-readable medium of claim 26, wherein the common timing source is the Global Positioning System (GPS).

28. The non-transitory computer-readable medium of claim 26, wherein the common timing source is a Network Time Protocol (NTP) server.

29. The non-transitory computer-readable medium of claim 26, wherein the base station and the multiple other base stations belong to a same paging group.

30. The non-transitory computer-readable medium of claim 26, wherein the current frame number is determined as $CurrentFrameNumber = (T/FrameLength) \mod 2^{24}$, where T is the integral time offset.

* * * * *